US006249892B1

(12) United States Patent
Rajsuman et al.

(10) Patent No.: US 6,249,892 B1
(45) Date of Patent: Jun. 19, 2001

(54) CIRCUIT STRUCTURE FOR TESTING MICROPROCESSORS AND TEST METHOD THEREOF

(75) Inventors: Rochit Rajsuman; Hiroaki Yamoto, both of Santa Clara, CA (US)

(73) Assignee: Advantest Corp., Tokyo (JP)

( * ) Notice: Subject to any disclaimer, the term of this patent is extended or adjusted under 35 U.S.C. 154(b) by 0 days.

(21) Appl. No.: 09/182,382

(22) Filed: Oct. 29, 1998

(51) Int. Cl.[7] .................................................. G01L 31/28

(52) U.S. Cl. ........................ 714/741; 714/739; 714/727

(58) Field of Search .................................. 714/724, 726, 714/728, 719, 735–736, 738, 718, 741, 824, 739; 702/67; 365/189.07, 201; 712/226, 223, 225

(56) References Cited

U.S. PATENT DOCUMENTS

| 4,481,627 | * | 11/1984 | Beauchesne et al. ............... 714/718 |
| 5,237,460 | * | 8/1993 | Miller et al. ............................ 360/8 |
| 5,644,578 | * | 7/1997 | Ohsawa ................................ 714/719 |
| 5,909,572 | * | 6/1999 | Thayer et al. ....................... 712/226 |
| 6,061,283 | * | 5/2000 | Takahashi et al. ................... 365/201 |
| 6,073,264 | * | 6/2000 | Nelson et al. ....................... 714/738 |

OTHER PUBLICATIONS

Bhattacharya et al.(Transformations and Resynthesis for Testability of RT–Level Control–Data Path Specifications; IEEE, Sep. 1993).*
Bhattacharya et al.(Bridging Behavioral and RegisterTransfer Synthesis; IEEE, Feb. 1992).*
Bhattacharya et al.(RT–Level Transformations for Gate–Level Testability; IEEE, Feb. 1993).*
Bhattacharya et al.(An RTL Methodology to Enable Low Overhead Combinational Testing; IEEE, Mar. 1997).*
Bhattacharya et al.(H–Scan: A High Level Alternative to Full–Scan Testing with Reduced Area and Test Application Overheads; IEEE, May 1996).*
Donaldson et al.(DISC: Dynamic Instruction Stream Computer—An Evaluation of Performance; IEEE; Jan. 1993).*

* cited by examiner

Primary Examiner—Albert Decady
Assistant Examiner—Guy J. Lamarre
(74) Attorney, Agent, or Firm—Muranmatsu & Associates (57) ABSTRACT

A test circuit is capable of testing functions of a microprocessor without involving any performance penalty or substantial increase in area overhead. The test circuit includes a test control register for providing test instructions to an instruction decoder of the microprocessor, a first multiplexer for selecting either the test instructions from the test control register or instructions from an instruction fetch unit, a linear feedback shift register for providing test operand to an instruction execution unit of the microprocessor wherein the test operand is random data for executing the instruction execution unit multiple times per instruction from the test control register, a second multiplexer for selecting either the test operand from the linear feedback shift register or operand from the main memory, a multi-input feedback shift register for receiving results from the instruction execution unit, and a controller for providing the test instruction to the test control register and the linear feedback shift register and evaluating an output signature of the multi-input feedback shift register.

16 Claims, 7 Drawing Sheets

/* Testbench for fault-free MISR signatures*/
Activate test mode; it determines logic values for test mode select and control signals
For opcode I = 1 to N
       Initialize LFSR and MISR
       Load opcode 1 into TCR
       Activate LFSR and MISR for a predetermined number of clocks
       Stop LSFR and MISR
       Record MISR content; this is fault-free signature for instruction 1
Continue

Fig.3B

The simulation run under the above testbench will appear as follows

Activate test mode
Opcode 1 in TCR
       Clock LFSR and MISR for m-cycles (m is predetermined number)
       Take-out MISR signature
Opcode 2 in TCR
       Clock LFSR and MISR for m-cycles
       Take-out MISR signature
Opcode 3 in TCR
       .
       .
Opcode N in TCR
       Clock LFSR and MISR for n-cycles
       Take-out MISR signature

Fig. 4A

Parallel-out to instruction decode logic

Fig. 4B

Pseudo random data to execution unit

CIRCUIT STRUCTURE FOR TESTING MICROPROCESSORS AND TEST METHOD THEREOF

FIELD OF THE INVENTION

This invention relates to a circuit structure and method for testing microprocessors and microcontrollers, and more particularly, to a circuit structure and method for testing microprocessors and microcontrollers in an IC chip or circuit board with substantially no increase in hardware overhead.

BACKGROUND OF THE INVENTION

Microprocessor and microcontroller (hereinafter "microprocessor") testing is considered one of the most complex problem in IC testing. In general, an automatic test equipment (ATE) such as an IC tester is commonly used for testing a microprocessor. An IC tester provides a test pattern to the microprocessor under test and the resultant response of the microprocessor is evaluated by expected value data. Because the recent microprocessors have dramatically improved their performance, such as operating speeds, density, functionality, and pin counts, an IC tester for testing such microprocessors needs to be very large scale, high speed, and accordingly very expensive. For example, such an IC tester has several hundreds or more test pins (test channels), each of which includes a pattern generator, timing generator and a frame processor, resulting in a very large and high cost system.

In other approach, various design-for-test (DFT) and built-in self-test (BIST) schemes such as scan, partial scan, logic BIST, scan-based BIST are used to test various logic blocks within a microprocessor. The main problem in these approaches is the requirement of large amount of additional hardware area (extra logic circuits) to implement the test logic. For example, scan implementation in general requires approximately 10% area overhead and scan-based BIST requires approximately 10–15% area overhead on top of the scan implementation. This large area overhead causes larger die, which results into smaller number of dies per wafer, lower yield and higher cost.

In addition, these test schemes also cause a 5–10% performance penalty. Typically, such a performance penalty is a signal propagation delay in the microprocessor because of the additional hardware overhead in the microprocessor. For example, in the scan implementation, each flip-flop circuit in the microprocessor is preceded by a selector (multiplexer) to selectively provide the flip-flop either a scan-in signal or a normal signal. Such an additional selector causes a delay time in the overall performance of the flip-flop circuit. Thus, the design-for-test and built-in self-test schemes adversely affect the microprocessor's performance, such as an operating speed because of the signal propagation delays.

SUMMARY OF THE INVENTION

Therefore, it is an object of the present invention to provide a method and structure for testing microprocessors without having the disadvantages involved in the conventional technologies.

It is another object of the present invention to provide a method and structure for testing microprocessors which require substantially no hardware overhead in the IC chip.

It is a further object of the present invention to provide a method and structure for testing microprocessors which involve no performance penalty in the microprocessors to be tested.

It is a further object of the present invention to provide a method and structure for testing microprocessors which are capable of testing the microprocessors with low cost and high efficiency.

In the present invention, three extra registers are added to the periphery of the microprocessor and random test patterns are provided to the microprocessor and the response of the microprocessor is compressed before being compared with the pre-computed signature.

The present invention, for testing a microprocessor having an instruction fetch unit, an instruction decoder, a system memory, and an instruction execution unit, is comprised of:

a test control register for providing instructions to the instruction decoder of the microprocessor during testing;

a first multiplexer for selecting either the test instructions from the test control register or instructions from the instruction fetch unit;

a linear feedback shift register for providing test operand to the instruction execution unit of the microprocessor;

a second multiplexer for selecting either the test operand from the linear feedback shift register or operand from the system memory;

a multi-input feedback shift register for receiving results from the instruction execution unit, and a controller for providing the test instruction to the test control register and the linear feedback shift register and evaluating an output signature of the multi-input feedback shift register.

Another aspect of the present invention is a method of testing a microprocessor which is comprised of the following steps of:

(a) activating a test mode;

(b) initializing a test control register, a linear feedback shift register, and a multi-input feedback shift register;

(c) loading the test control register with opcode (operation code) of a test instruction;

(d) providing contents of the test control register to the instruction fetch;

(e) clocking the linear feedback shift register and multi-input feedback shift register either for a fixed number of cycles or $2^N-1$ cycles, where N is a number of stages of the linear feedback shift register and multi-input feedback shift register;

(f) taking out contents (signature) of the multi-input feedback shift register;

(g) comparing the signature of the multi-input feedback shift register with pre-computed simulation signature to determine if there is a fault; and (h) repeating the foregoing steps (a)–(g) with different instruction until all instructions are exercised.

The present invention does not require large area overhead, it requires only three registers, and causes no performance penalty. This method is applicable to both standard product microprocessors as well as embedded microprocessors, embedded cores, 2D/3D graphics accelerators, DSP (digital signal processor), audio/video, and multi-media chips.

DETAILED DESCRIPTION OF THE PREFERRED EMBODIMENT

Figure 1:
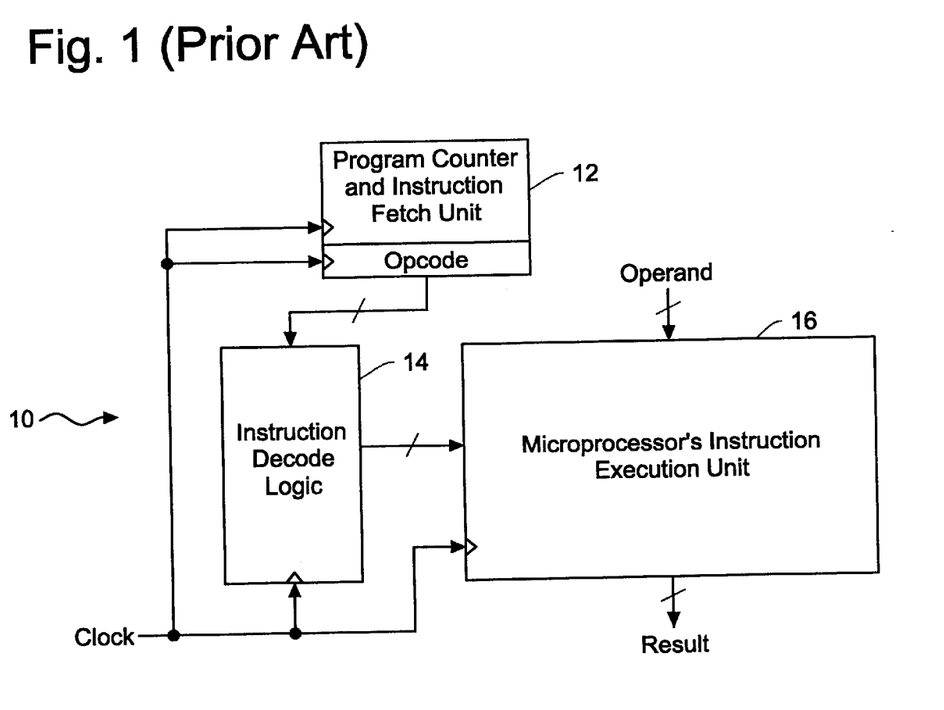
FIG. 1 is a schematic diagram showing a basic structure of a microprocessor.

The general structure of a microprocessor and microcontroller (hereinafter collectively "microprocessor") is shown in FIG. 1. A typical microprocessor 10 includes a program counter and instruction fetch unit 12, an instruction decode logic 14, an instruction execution unit 16, and a system memory (not shown). The instruction fetch unit 12 obtains the opcode of the next instruction based upon the address in the program counter. This opcode is decoded by the instruction decode logic 14, which generates function select and control signals for the instruction execution unit 16. The instruction execution unit 16 also receives the operand (data enters or results from the operation) as shown in FIG. 1. Based upon these control signals, one of the logic blocks within the instruction execution unit 16 computes its function. The operand or data for this computation are obtained from the system memory.

In the present invention, the inventors have modified this general structure by three registers and two multiplexers. The basic idea of the invention is to use extra registers to scan-in one instruction, execute it multiple times with pseudo random data and take out the resultant signature. One of the extra registers is Test Control Register (TCR) to provide the opcode of microprocessor's instructions during the test mode. Two additional registers, one Linear Feedback Shift Register (LFSR) and another Multi-Input Feedback Shift Register (MISR) are used to generate random data and to compress the test response respectively. The data from LFSR is used as operand for the instruction provided by the TCR. The computed result is stored in MISR. The idea behind using the random data and compression thereof is to substantially reduce the test time and obtain a high fault coverage.

Figure 2:
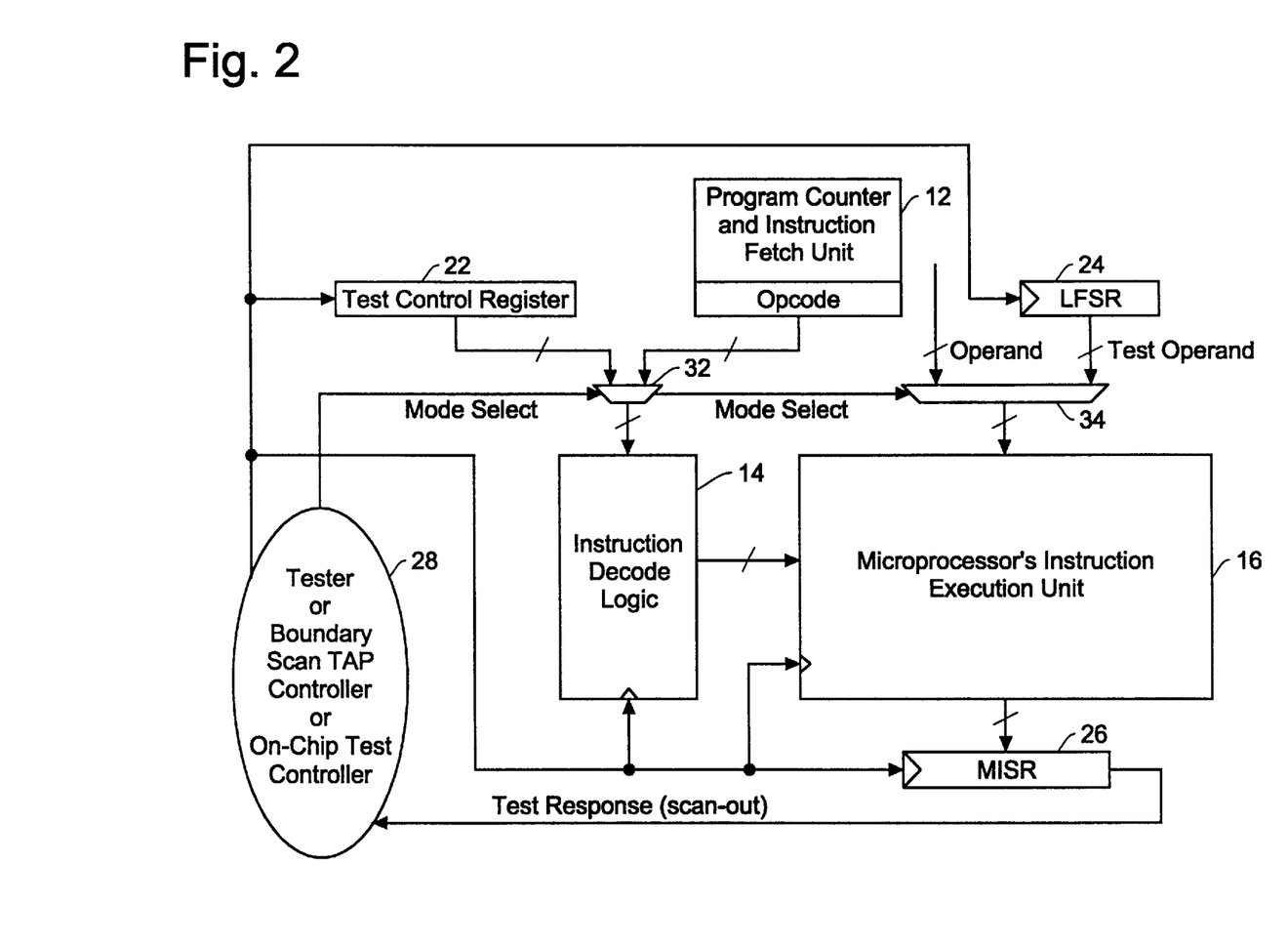
FIG. 2 is a schematic diagram showing an example of structure to be added to the microprocessor for implementing the test method of the present invention.

This principle is illustrated in FIG. 2. In FIG. 2, it is shown instruction and data flows during a test mode and a normal mode. The additional registers TCR 22, LFSR 24, and MISR 26 as well as additional multiplexers 32 and 34 are also shown. The additional registers TCR 22, LFSR 24, and MISR 26 are used in the test mode. The multiplexers 32 and 34 are used to switch the paths for these additional registers between the test mode and the normal mode. TCR 22 is to provide the opcode of microprocessor's instructions during the test mode. LFSR 24 and MISR 26 are used to generate random test data and to compress the test response, respectively.

LFSR 24 generates the test operand for the instruction provided by TCR 22. The computed result from the execution unit 16 is stored in MISR 26. A multiplexer 32 and a multiplexer 34 are provided to TCR 22 and LFSR 24, respectively, as shown in FIG. 2 to switch between the test mode and the ordinary mode. FIG. 2 also shows a controller 28 which may be an IC tester, a boundary scan TAP (test access port) controller, or an on-chip test controller. The controller 28 is to control an overall test process by transmitting a mode select signal to the multiplexers 32 and 34 as well as test instructions to the microprocessor 10 under test through TCR 22 and LFSR 24, and compares the resultant response of the microprocessor 10 with the pre-computed expected value.

In the test mode, by a mode select signal to the multiplexers 32 and 34, TCR 22 and LFSR 24 are electrically connected to the microprocessor 10. Test instruction is provided to the TCR 22 through the controller 28 (IC tester or other control means) as noted above. The test instruction is then given to the instruction decode logic 14 through the multiplexer 32 and to the instruction execution unit 16. Based on the test instruction, LFSR 24 generates test patterns which are applied to the execution unit 16 through the multiplexer 34. In this example, the test pattern generated by the LFSR 24 is a random pattern as noted above. The resultant output of the execution unit 16 is compressed by MISR 26 to produce a signature which is evaluated by the IC tester or other control means.

The sequence of testing operation in this scheme is summarized as follows:

(1) Activate the test mode. In this mode, contents of TCR 22 are used as instruction rather than that of the instruction fetch unit 12.

(2) Initialize TCR 22, LFSR 24 and MISR 26 either by direct control or via test control signals from the controller 28 which is an IC tester, boundary scan controller or on-chip test controller, depending upon implementation.

(3) Load TCR 22 with the opcode of an instruction. Based upon implementation, it can be either parallel load or serial load (such as scan-in).

(4) Clock LFSR 24 and MISR 26 either for a fixed number of cycles or $2^N-1$ cycles (full length) for N-bit LFSR. This step repeatedly executes the instruction in TCR 22 with LFSR data. For example, if 1,000 clocks are used, the instruction in TCR 22 is executed 1,000 times with 1,000 different operand (random data provided by the LFSR 24).

(5) Take out the content (signature) of MISR 26 to determine pass/fail.

(6) Compare the content of MISR 26 with pre-computed simulation signature to determine if there is a fault. An IC tester or other automatic test equipment (ATE) can perform this comparison.

(7) Repeat the steps (2) to (6) with different instruction until all instructions are exercised.

Figure 3A:
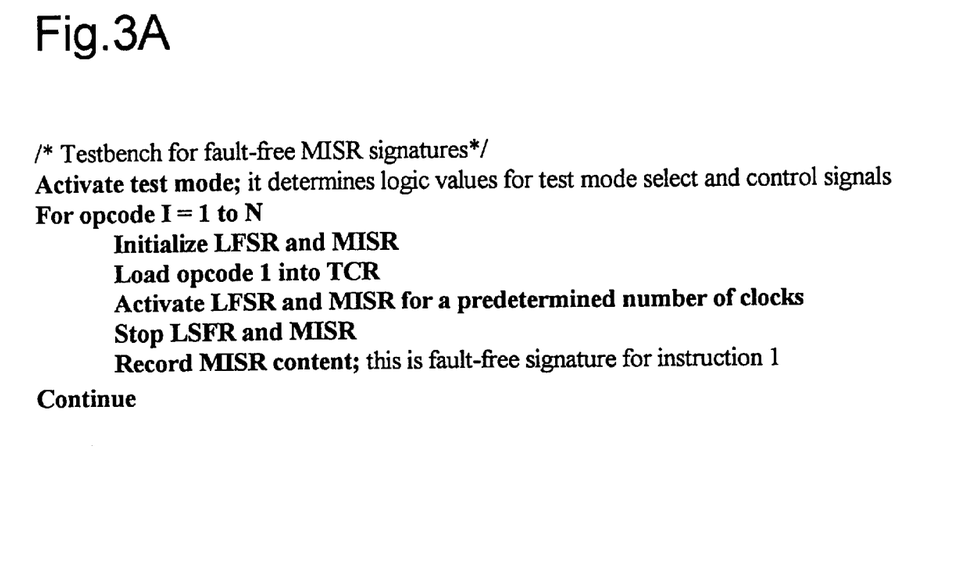
FIGS. 3A and 3B show examples of pseudo-code for simulation testbench to collect fault free values of MISR (multi-input feedback shift register) for each instruction in accordance with the present invention.
Figure 3B:
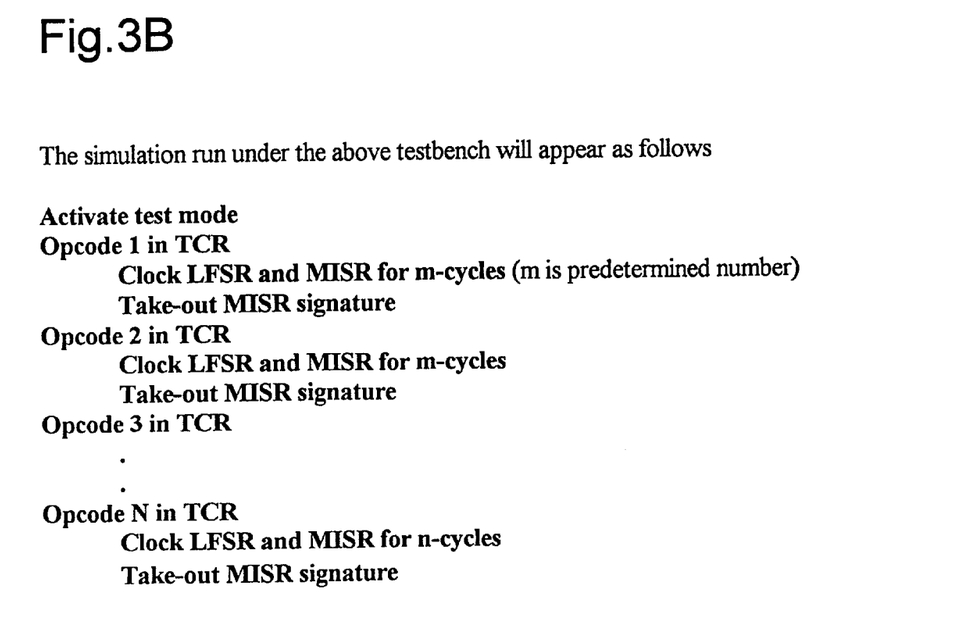

The above sequence of operation assumes that after the design completion of the microprocessor to be tested, a simulation testbench is developed which exercises all instructions with LFSR data and MISR signatures after each run has been recorded. Thus, the fault free MISR content after the each instruction run is known through the simulation. An example of the pseudo code to develop such simulation testbench for each instruction is given in FIGS. 3A and 3B.

The above procedure determines that each instruction is executed correctly and hence, it provides functional fault coverage. If stuck-at fault (fault in a circuit which causes a line to remain permanently either at logic 1 or at logic 0) coverage is also desired, then fault simulation can be performed with various values of m (number of patterns generated by LFSR). For example, fault simulation with m=1, 000, or 10,000 or exhaustive length will provide different levels of stuck-at fault coverage. Based upon this, one can select a value of m for a particular application. For fault simulation, any commercial EDA tool, such as Cadence's VeriFault can be used.

Figure 4A:
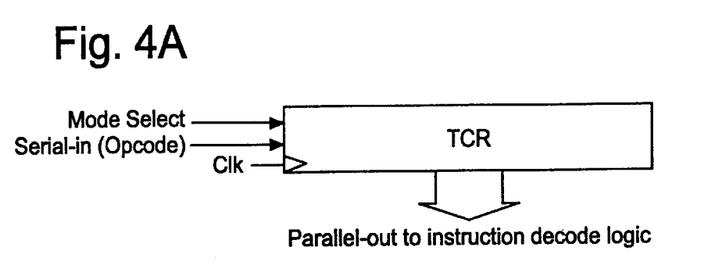
FIGS. 4A–4C are schematic diagrams showing examples of shift registers TCR (test control register), LFSR (linear feedback shift register) and MISR (multi-input feedback shift register) to be used in the test method and structure of the present invention.
Figure 4B:
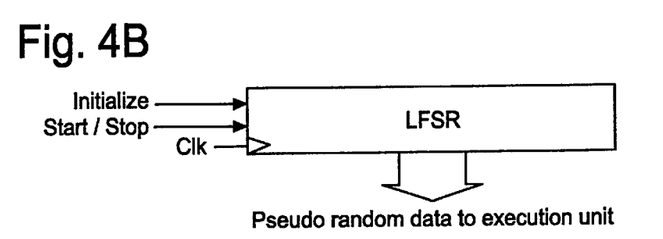
Figure 4C:
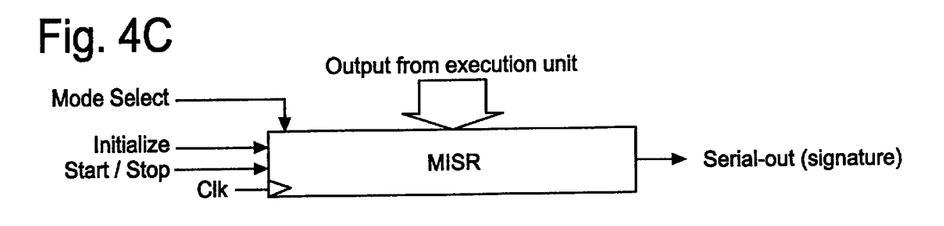

FIG. 4 shows examples of structure of the registers TCR, LFSR and MISR. There can be many ways to implement this scheme depending how the overall control is done. Such control can be obtained by an IC tester, implemented through a boundary scan TAP controller or an independent on-chip test controller. The implementation of TCR, LFSR and MISR will also vary slightly based upon the overall controlling mechanism. Thus, one possible description of TCR, LFSR and MISR is given in FIGS. 4A–4C which provide a behavioral level description (in-terms of input/output form) for which many gate-level or transistor level implementations are possible. In the present invention, the basic requirements for these registers are:

Test control register (TCR):

It should be a parallel-out register. It can be either a serial input or parallel input type; however, the parallel input type will cause a large number of wires to become primary input at the chip-level. The serial input implementation will require only one wire to be primary input. If it is implemented as a serial input type, it will also require a mode select signal to switch it from serial-in to parallel-out and vice-versa as shown in FIG. 4A.

Linear feedback shift register (LFSR):

It needs initialize and start/stop signals as shown in FIG. 4B. The start/stop signal can be the same as a test control signal or a signal derived from the test control signal, as shown in FIG. 2. Any polynomial can be implemented in LFSR 24, however, prime polynomial is advantageous to obtain $2^N-1$ patterns. The pseudo random pattern generated by LFSR 24 is provided to the execution unit 16.

Multi-Input feedback shift register (MISR):

It also needs initialize and start/stop signals as shown in FIG. 4C. In addition, it also needs a serial-out and a mode-select signal to switch it from a data compression mode to a shift register mode and vice-versa. Instead of serial-out, it can be parallel out, however, that will cause a large number of wires to be primary output at the chip-level. The start signal of MISR 26 can be derived from the start signal of the LFSR 24. To avoid the unknown data in a pipeline of the execution unit 16, the start signal for MISR 26 should be delayed by a time equal to (or more) the latency of pipeline.

Figure 5A:
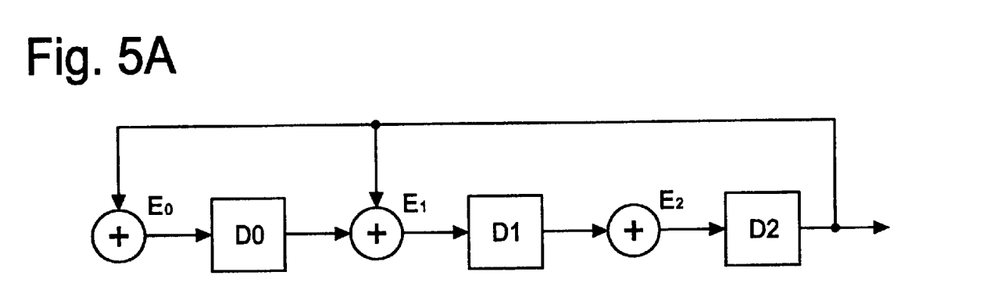
FIGS. 5A and 5B are block diagrams showing further examples of structure of LFSR (linear feedback shift register) and MISR (multi-input feedback shift register) of FIGS. 4B and 4C.
Figure 5B:
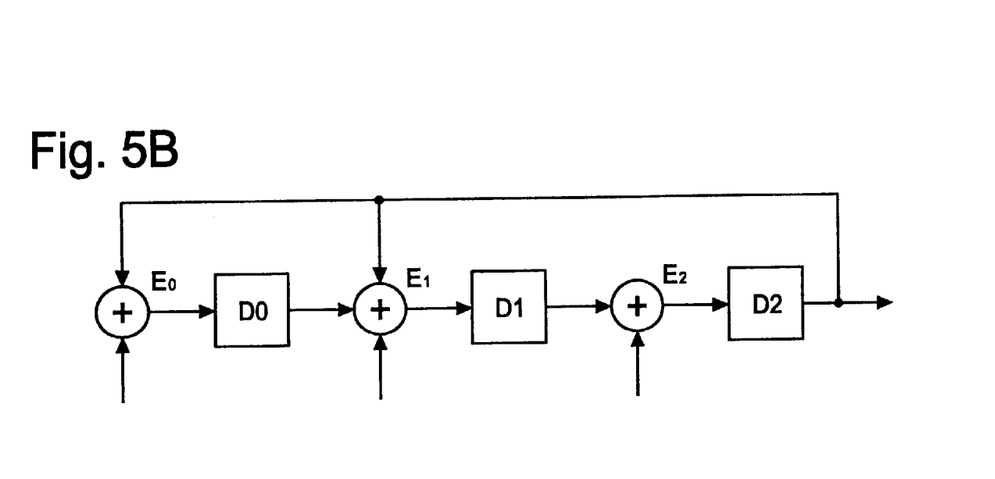

FIGS. 5A and 5B show examples of LFSR and MISR in a flip-flop level. An example of LFSR in FIG. 5A is formed of series connected D flip-flops D0–D2 and exclusive OR gates E0–E2 for establishing feedback connections for the flip-flops. As is well known in the art, this structure is to generate a pseudo random signal. An example of MISR is substantially the same as LFSR except for an additional input at each of the exclusive OR gates E0–E2.

The control of this scheme can be implemented in many ways as indicated by the examples of controller 28 in FIG. 2. The implementation directly through the logic tester (ATE) is straightforward. In such a case, the logic tester provides the clock and test control signals as well as evaluates the test response (MISR signature) to determine pass/fail.

In a case when an IC under test has either an on-chip test controller or boundary scan capability, the test control signals and test response is passed through (or even controlled by) the on-chip test controller or boundary scan TAP controller. For example, RUNBIST instruction in the boundary scan TAP controller can be implemented to generate the test control signals; the opcode in TCR can be scanned-in and test response can be scanned-out through the TAP controller.

Figure 6:
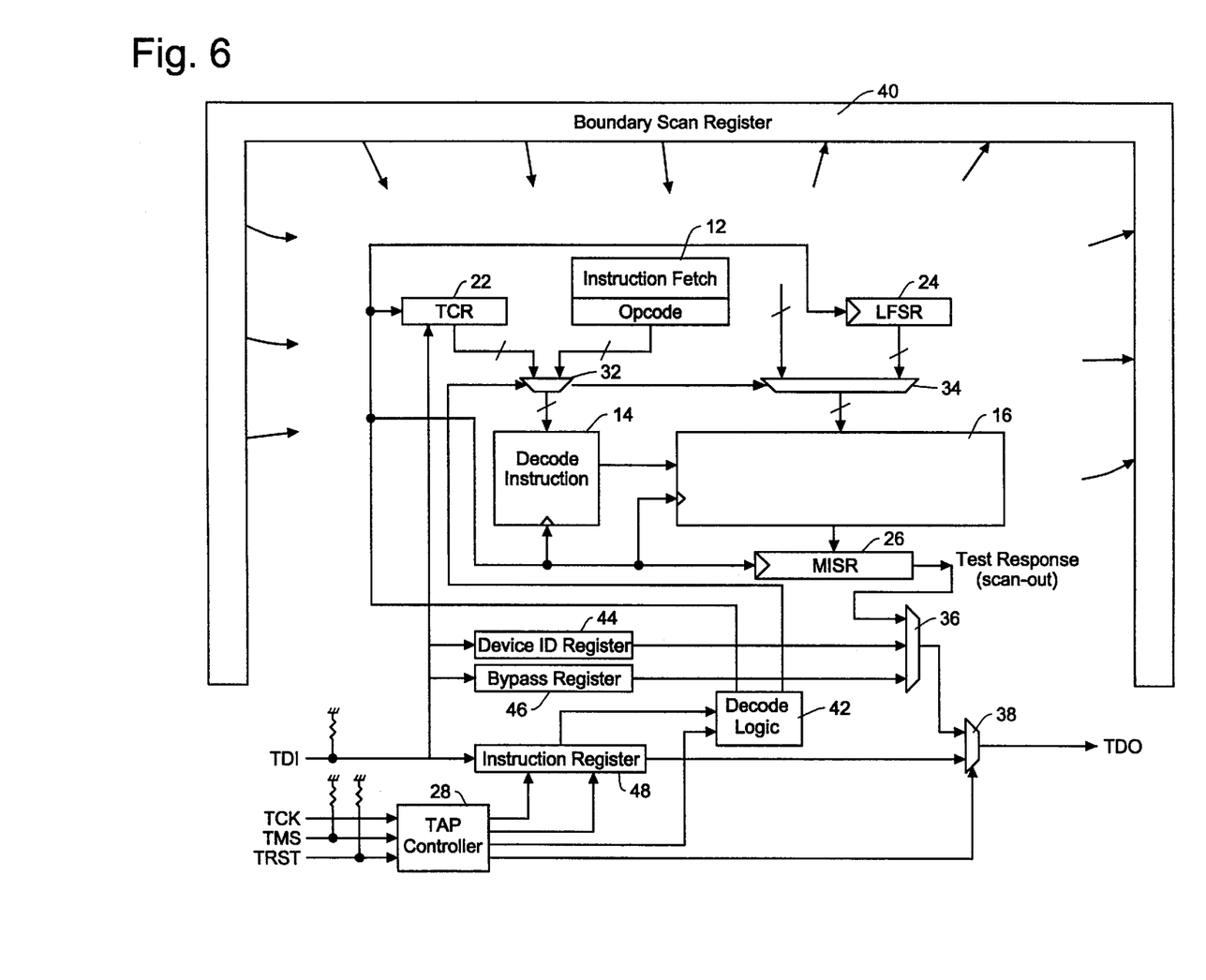
FIG. 6 is a schematic block diagram showing an example of structure for implementing the present invention through a boundary scan TAP (test access port) controller.

FIG. 6 illustrates such implementation by the boundary scan TAP controller, which is based on a standard boundary scan architecture defined by IEEE/ANSI standard 1149.1. A boundary scan register (scan chain) 40 is introduced at input-output pins of the microprocessor to be tested. A test data input (TDI) pin is connected to an instruction register 48 as well as to TCR 22, a device ID register 44, a bypass register 46. The TAP controller 28 includes I/O pins of a test clock (TCK), test mode select signal (TSM) and test reset (TRST). Multiplexers 36 and 38 are provided to transmit the signature from MISR 26 to a test data output (TDO) pin. In this arrangement, the test is performed by shifting the test vectors and instructions into the microprocessor 10 through the TDI pin, TCR 22 and LFSR 24, and scanning out the response of the microprocessor 10 through MISR 26 and the TDO pin.

Both FIGS. 2 and 6 show the execution unit as a black box. Depending upon the IC, it can be a simple ALU or a group of complex blocks implementing integer and floating point arithmetic and logic operations. One such example is given in FIG. 7.

Figure 7:
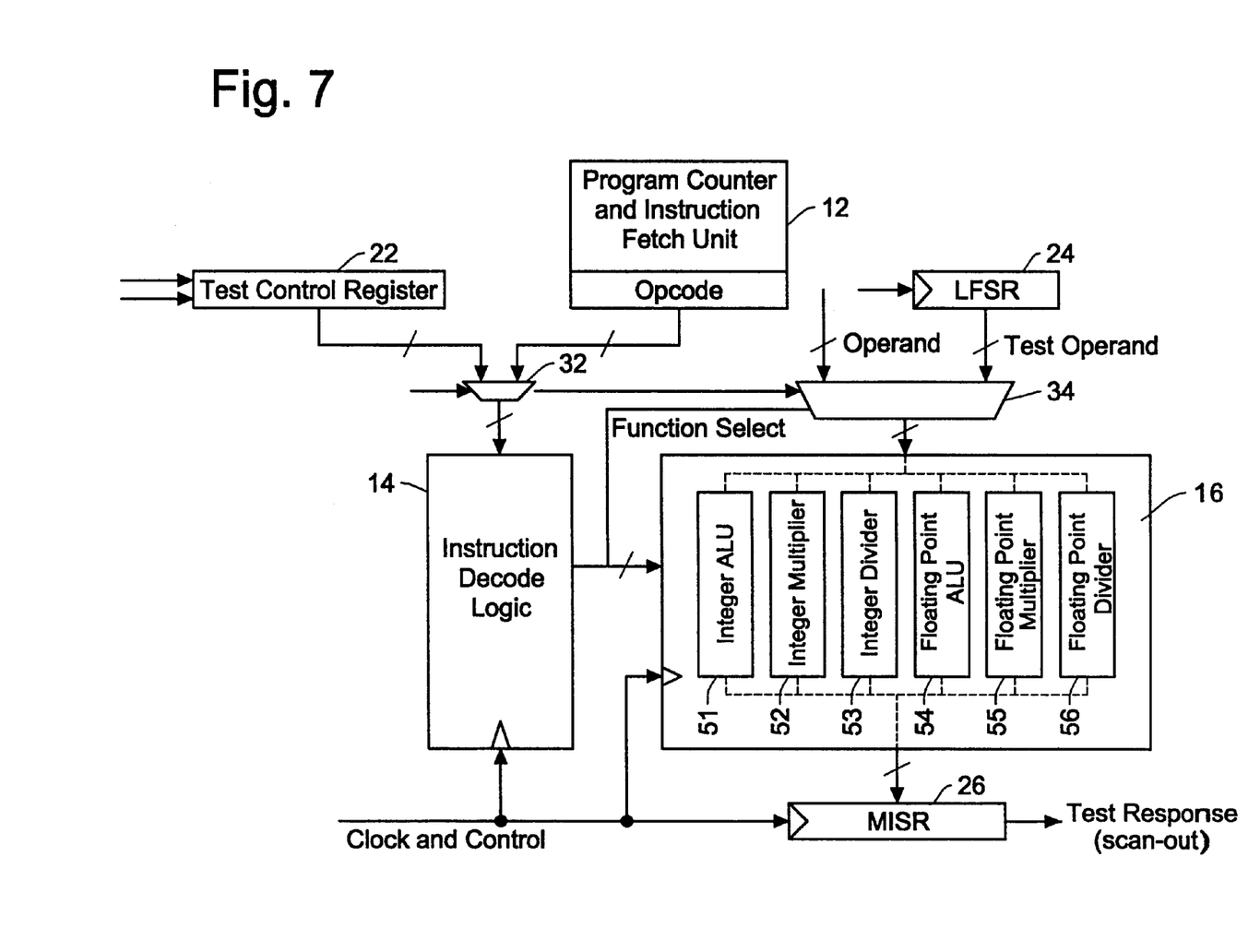
FIG. 7 is a schematic block diagram showing an example of structure for implementing the present invention for testing a microprocessor having a complex execution unit.

In the example of FIG. 7, an execution unit 16 includes multiple blocks of integer and floating point arithmetic units 51–56. However, it should be noticed from FIG. 7 that the implementation of this new test method has not changed and it is still the same as FIGS. 2 and 6. The only difference is that the function select multiplexer 34 of the execution unit 16 has been modified so that it will also function as the operand select multiplexer. In FIGS. 2 and 6, there is no function select multiplexer, hence, an additional multiplexer is added to select LFSR data as operand during testing corresponding to each of the arithmetic functions 51–56. In another situation when a function select multiplexer is implemented inside the execution unit 16, the implementation of test method will be identical to that shown in FIGS. 2 and 6.

The major benefits of the present invention is that the hardware overhead in this scheme is negligible and it provides 100% functional fault coverage and additional stuck-at fault coverage. The hardware overhead needed in this invention is negligible and it causes no performance penalty in the normal operation of the IC. The present invention is applicable to a wide range of ICs such as standard product microprocessors or microcontrollers, embedded microprocessors, embedded cores, 2D/3D graphics accelerators, DSP, audio/video and multi-media chips.

This scheme provides following two kinds of fault coverage:

(1) Functional fault coverage: As each instruction is executed multiple times with different data, it ensures the functional correctness of each instruction.

(2) Stuck-at fault coverage: As different lines are sensitized depending upon instruction in the TCR and LFSR data, comparing MISR signature with simulation signature ensures that various lines do not have stuck-at faults. The fault simulation of the gate level model of the execution unit with LFSR, MISR and TCR can quantify the exact stuck-at fault coverage during manufacturing testing.

In terms of area overhead, this scheme requires only three extra registers and at-most two multiplexers. The three registers are, one TCR of length equal to microprocessor's word-size (width of instruction), one LFSR and one MISR. Both LFSR and MISR can be of any length. For all practical purposes either 16-bits or 32-bits wide LFSR and MISR are good enough. If the width of data bus is different than the width of LFSR, multiple fan-out can be taken from LFSR output to match the data-width.

Although only preferred embodiments are specifically illustrated and described herein, it will be appreciated that many modifications and variations of the present invention are possible in light of the above teachings and within the purview of the appended claims without departing the spirit and intended scope of the invention.

What is claimed is:

1. A circuit structure for testing functions of a microprocessor having an instruction fetch unit, an instruction decoder, a main memory, and an instruction execution unit, comprising:

a test control register for providing test instructions to the instruction decoder of the microprocessor;

a first multiplexer for selecting either the test instructions from the test control register or instructions from the instruction fetch unit;

a linear feedback shift register for providing test operand to the instruction execution unit of the microprocessor, the test operand being random data for operating the instruction execution unit multiple times per instruction from the test control register;

a second multiplexer for selecting either the test operand from the linear feedback shift register or operand from the main memory;

a multi-input feedback shift register for receiving results from the instruction execution unit of the microprocessor in a compressed form of data; and a controller for providing the test instruction to the test control register and the linear feedback shift register, and evaluating an output signature of the multi-input feedback shift register.

2. The circuit structure for testing the functions of a microprocessor as defined in claim 1, wherein the linear feedback shift register generates the test operand which is a random test pattern, and an output of the instruction execution unit responsive to the random test pattern is compressed by the multi-input feedback shift register.

3. The circuit structure for testing the functions of a microprocessor as defined in claim 1, wherein the controller provides the test instruction to the test control register and to the linear feedback shift register wherein the test instruction is simulated by a simulation testbench at the design stage of the microprocessor under test and correct data of signature is prepared in the controller prior to the start of the test to compare the correct data with the output data of the multi-input feedback shift register.

4. The circuit structure for testing the functions of a microprocessor as defined in claim 1, wherein the controller is either an IC tester, a test access port controller in a boundary scan architecture, or an on-chip controller in an IC-chip.

5. The circuit structure for testing the functions of a microprocessor as defined in claim 1, wherein the test control register receives the test instruction from the controller in series and sends the test instruction to the instruction decoder in parallel.

6. The circuit structure for testing the functions of a microprocessor as defined in claim 1, wherein the linear feedback shift register includes a plurality of series connected flip-flops and at least one exclusive OR gate which feeds back an output signal of a later stage flip-flop to an input of a former stage flip-flop, the linear feedback shift register having an initialize input for initializing the series connected flip-flops and a start/stop input for controlling start and stop operations of the linear feedback shift register.

7. The circuit structure for testing the functions of a microprocessor as defined in claim 1, wherein the multi-input feedback shift register includes a plurality of series connected flip-flops and two or more exclusive OR gates at least one of which feeds back an output signal of a later stage flip-flop to an input of a former stage flip-flop, the multi-input feedback shift register having two or more inputs connected to the corresponding exclusive OR gates, an initialize input for initializing the series connected flip-flops and a start/stop input for controlling start and stop operations of the multi-input feedback shift register.

8. The circuit structure for testing the functions of a microprocessor as defined in claim 1, wherein the second multiplexer further includes a function select capability for selectively providing the test operand to corresponding arithmetic units when the instruction execution unit has a plurality of arithmetic units therein.

9. A method for evaluating functions of a microprocessor having an instruction fetch unit, an instruction decoder, a main memory, and an instruction execution unit, comprising the steps of:

activating a test mode;

initializing a test control register, a linear feedback shift register, and a multi-input feedback shift register;

loading the test control register with opcode of a test instruction;

providing contents of the test control register to the instruction decoder;

clocking the linear feedback shift register and multi-input feedback shift register either for a fixed number of cycles or $2^N-1$ cycles, where N is a number of stages of the linear feedback shift register and multi-input feedback shift register, applying operand, which is random data, from the linear feedback shift register to the instruction execution unit, thereby operating the instruction execution unit multiple times per one test instruction from the test control register;

taking out contents of the multi-input feedback shift register as a signature of compressed data representing results from the instruction execution unit;

comparing the signature of the compressed data with a pre-computed simulation signature produced based on design data obtained at a design stage of the microprocessor under test to determine if there is a fault; and repeating the foregoing steps with different instruction until all instructions are exercised.

10. The method for evaluating the functions of a microprocessor as defined in claim 9, wherein the linear feedback shift register generates the test operand which is a random test pattern, and an output of the instruction execution unit responsive to the random test pattern is compressed by the multi-input feedback shift register.

11. The method for evaluating the functions of a microprocessor as defined in claim 9, wherein the controller provides the test instruction to the test control register and to the linear feedback shift register wherein the test instruction is simulated by a simulation testbench at the design stage of the microprocessor and correct data of signature is prepared in the controller prior to the start of the test to compare the correct data with the output data of the multi-input feedback shift register.

12. The method for evaluating the functions of a microprocessor as defined in claim 9, wherein the controller is either an IC tester, a test access port controller in a boundary scan architecture, or an on-chip controller in an IC-chip.

13. The method for evaluating the functions of a microprocessor as defined in claim 9, wherein the test control register receives the test instruction from the controller in series and sends the test instruction to the instruction decoder in parallel.

14. The method for evaluating the functions of a microprocessor as defined in claim 9, wherein the linear feedback shift register includes a plurality of series connected flip-flops and at least one exclusive OR gate which feeds back an output signal of a later stage flip-flop to an input of a former stage flip-flop, the linear feedback shift register having an initialize input for initializing the series connected flip-flops and a start/stop input for controlling start and stop operations of the linear feedback shift register.

15. The method for evaluating the functions of a microprocessor as defined in claim 9, wherein the multi-input feedback shift register includes a plurality of series connected flip-flops and two or more exclusive OR gates at least one of which feeds back an output signal of a later stage flip-flop to an input of a former stage flip-flop, the multi-input feedback shift register having two or more inputs connected to the corresponding exclusive OR gates, an initialize input for initializing the series connected flip-flops and a start/stop input for controlling start and stop operations of the multi-input feedback shift register.

16. The method for evaluating the functions of a microprocessor as defined in claim 9, wherein the second multiplexer further includes a function select capability for selectively providing the test operand to corresponding arithmetic units when the instruction execution unit has a plurality of arithmetic units therein.

* * * * *